May 7, 1935.  E. W. HUTCHINGS  2,000,391
MANUFACTURE OF BARREL STAVES
Original Filed Sept. 25, 1933  2 Sheets-Sheet 1
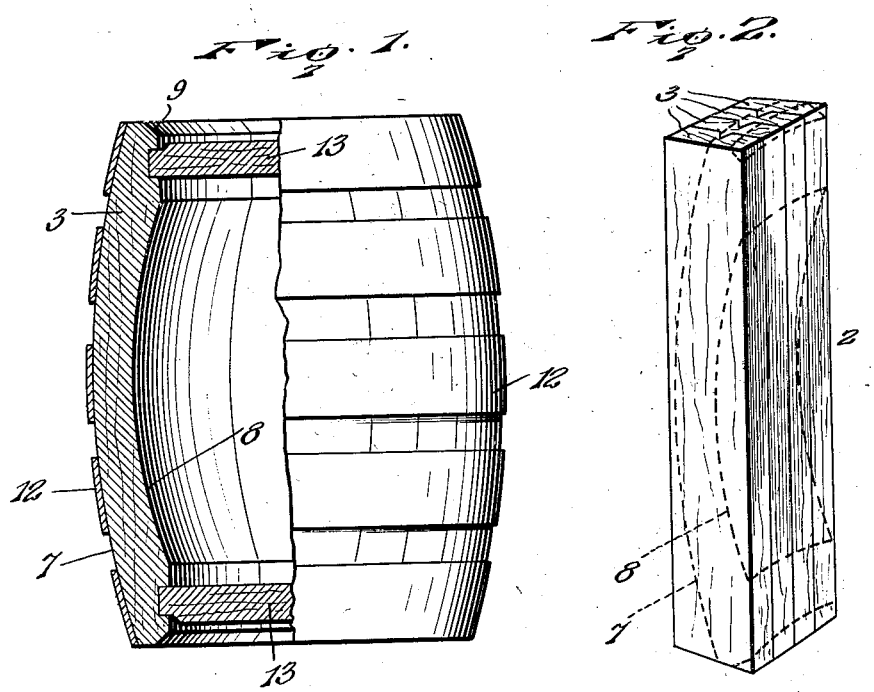
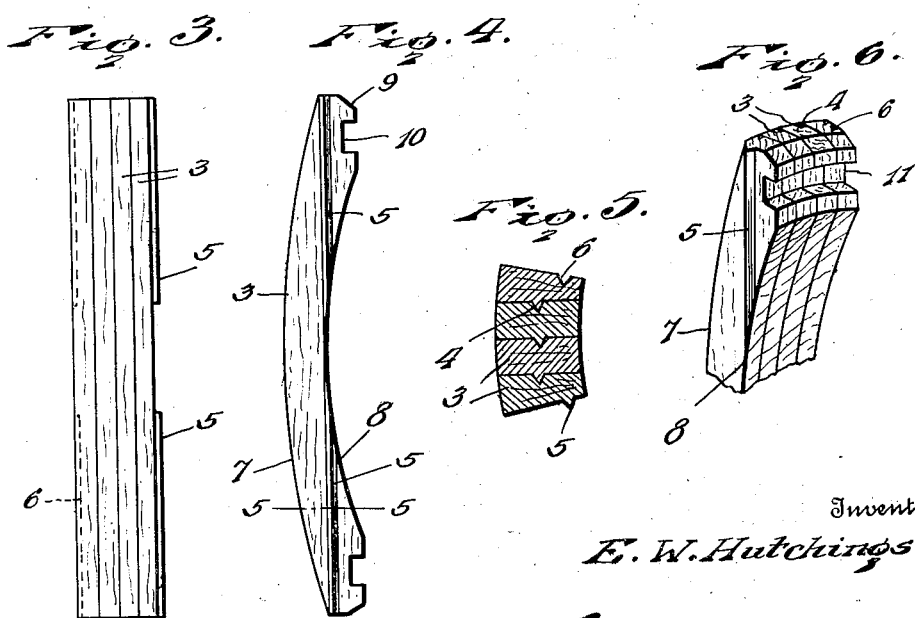
Inventor
E. W. Hutchings.
By Lacey & Lacey, Attorneys May 7, 1935.  E. W. HUTCHINGS  2,000,391
MANUFACTURE OF BARREL STAVES
Original Filed Sept. 25, 1933   2 Sheets-Sheet 2
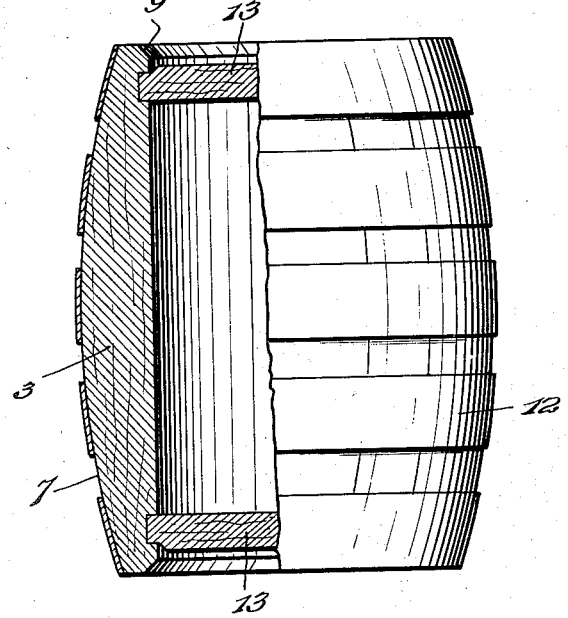
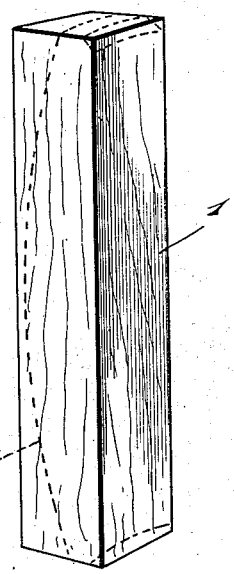
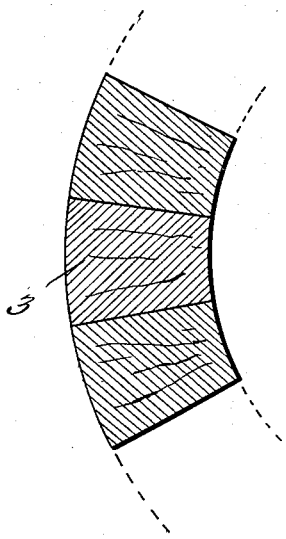
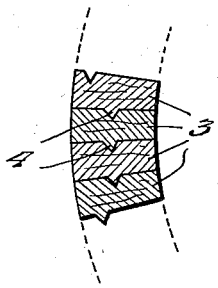
Inventor
E. W. Hutchings.
By Lacey & Lacey, Attorneys Patented May 7, 1935

2,000,391

UNITED STATES PATENT OFFICE 2,000,391

MANUFACTURE OF BARREL STAVES

Edward W. Hutchings, Perry, Fla.

Original application September 25, 1933, Serial No. 690,886. Divided and this application January 22, 1934, Serial No. 707,828

3 Claims. (Cl. 144—309)

This application is a division of an application filed by me September 25, 1933, Serial No. 690,886.

This invention relates to the manufacture of staves for barrels and other containers and the object is to utilize thoroughly seasoned and dried lumber which is now available and which will render unnecessary steaming of the stave in order to bring it into the desired shape. Staves for barrels and kegs, especially for beer kegs, have heretofore been cut from white oak and then subjected to steaming in order to be bent into the required curvature. White oak, however, at the present time, is very scarce and the steaming process is expensive and time consuming, while there is available a plentiful supply of thoroughly dried and seasoned lumber which may be utilized for the production of staves. It is an object of the present invention to utilize available lumber, and especially lumber which would otherwise be treated as waste, for the production of staves by a method which is expeditious and inexpensive. The invention will be herein fully described in connection with the accompanying drawings and resides in certain novel features which will be particularly pointed out in the appended claims.

In the drawings:

Figure 1 is a view partly in side elevation and partly in section of a keg including staves produced according to the present invention.

Figure 2 is a perspective view of a block from which a stave is to be made.

Figure 3 is an elevation of a stave produced from the block shown in Figure 2.

Figure 4 is an edge view of the stave.

Figure 5 is an enlarged detail section on the line 5—5 of Figure 4.

Figure 6 is a perspective view of one end of the stave.

Figure 7 is a view similar to Figure 1 showing a slightly different form of keg.

Figure 8 is a perspective view of a block from which is to be produced a stave, such as is employed in the keg shown in Figure 7.

Figure 9 is an enlarged section showing a slight modification of the stave.

Figure 10 is a section corresponding to Figure 5 but showing a variation.

According to the present invention, a block of wood, the length of which is equal to the height of the container, which is ultimately to be produced, is utilized as a blank from which staves are to be made. The block may be a single unit, as indicated at 1 in Figure 8, or it may be composed of laminations or strips, as shown at 2 in Figure 2. When the block is formed from a plurality of laminations, the several laminations 3 are fitted together until their combined width is equal to the width decided upon for the stave, and the stave is then formed from the block. The several strips or laminations are provided with mating tongues and grooves, as indicated at 4, whereby they will be held in proper alinement and the opposed surfaces of adjacent strips are coated with cement or glue or other adhesive so that they will be permanently and rigidly united in the blank. the intermediate strips may have their sides formed on parallel lines, as shown in Figure 5, while the outermost strips, which form the sides of the completed stave, will have their outer sides disposed on radial lines, also as shown in Figure 5. If preferred, however, the several strips may have their side faces disposed on radial or converging lines, as shown in Figures 9 and 10. When the strips have been secured together, a longitudinal rib 5 is formed on one side of the blank and a corresponding groove 6 is formed on the opposite side of the blank so that when two staves are fitted together the rib on one stave will engage in the groove on the other stave and the staves will thereby be maintained in fixed relation. The blank or block is then placed in a shaping machine and one side thereof is cut away at the ends so as to produce the outer convex surface 7, which is shown in Figure 4, and is indicated by the dotted lines in Figures 2 and 8. The opposite side of the block may be cut away to produce the concave surface 8 which will form the inner surface of the keg or barrel, but it may be preferred in many instances to have the inside of the keg or barrel a true cylinder, in which event the inner edges of the stave will be left straight, as will be understood upon reference to Figures 7 and 8. The corners of the inner faces of the staves are then beveled, as shown at 9, to produce the usual finish and notches 10 are cut in the inner faces of the staves to form the crozes 11. The kegs are assembled in cylindrical form in the usual manner and hoops 12 are placed around the keg or barrel to retain the staves in proper engagement, the heads 13 being fitted in the crozes in the usual manner.

From the foregoing description, taken in connection with the accompanying drawings, it will be seen that I have devised a method whereby staves may be expeditiously produced from thoroughly seasoned lumber without any recourse to steaming and whereby lumber which would otherwise be treated as waste may be utilized commercially. If there is available a single block of the proper width for a stave, as indicated in Figure 8, such block may be used, but if such a block is not available narrower blocks may be assembled, as shown in Figures 1 to 6, and secured together, and the manufactured block may be sawed and cut to the desired shape. The several blocks or laminations of the staves will present their grain longitudinally of the stave so that the completed keg will be strong and durable and fully adapted to withstand rough usage. The ribs 5, fitting in the grooves 6, are formed longitudinally of the blank parallel with the sides of the blank and when the blank is cut into the shape of the stave the rib will extend from the outer side of the stave at the ends thereof to the inner side of the stave adjacent the center and, consequently, will resist any tendency of adjacent staves to separate in a highly efficient manner. A stave produced in accordance with the present invention will be very inexpensive and may be produced more rapidly than staves made according to the process heretofore most generally followed.

Staves are generally four inches wide but it has been found that, by following the process herein set forth, staves can be made from a block three and one-fourth inches wide, thereby using less wood and incurring less waste without any sacrifice of strength. By forming a block of laminations very narrow strips may be used and by cementing the strips together a plurality of strips may be run through the shaping machine at one time which will cost less than running the strips through singly. The stock for the staves may be ripped from low grade boards which will constitute a very cheap and plentiful source of supply.

Having thus described the invention, I claim:

1. The method of producing a barrel stave which consists of forming a laminated block of strips having their side faces secured in flat contacting engagement with each other, shaping the block from the edge faces of the strips to form a stave having a convexed outer face curved longitudinally for the full length of the block and a concaved inner face curved longitudinally with its ends terminating in spaced relation to the ends of the block to provide end portions of the stave with flat inner faces, shaping the side faces of the block to form straight longitudinally extending ribs and grooves having their ends intersecting the ends of the convexed outer face and their intermediate portions intercepted by the concaved inner face, and cutting the flat inner face of the end portions of the block to form transversely extending crozes.

2. The method of producing a barrel stave which consists of assembling and securing flat strips of wood side by side to form a laminated block of the length and width of a stave with the edge faces of the strips forming inner and outer faces of the block, shaping by cutting the inner and outer faces of the block to form a stave having a longitudinally curved convexed outer face and a concaved longitudinally curved inner face with the ends of the latter face spaced from the ends of the block to provide end portions of the stave with flat inner faces, forming side faces of the stave with longitudinally extending ribs and grooves for holding companion staves in side by side engagement with each other, and cutting the flat inner faces of the end portions to form transversely extending crozes.

3. The method of producing a barrel stave which consists of forming a block of wood of the length and width of a stave, shaping inner and outer faces of the block to form a stave having a longitudinally curved convexed outer face and a concaved longitudinally curved inner face with the ends of the latter face spaced from the ends of the block to provide end portions of the stave with flat inner faces, shaping side faces of the block to form straight longitudinally extending ribs and grooves having their ends intersecting the ends of the convexed outer face and their intermediate portions intercepted by the concaved inner face, and cutting the flat inner faces of the end portions of the block to form transversely extending crozes.

EDWARD W. HUTCHINGS.